United States Patent [19]

Goodrich

[11] 4,237,036

[45] Dec. 2, 1980

[54] POLYMERIZABLE PREMIX COMPOSITION FOR PREPARATION OF POLYURETHANE SURFACES

[75] Inventor: Judson E. Goodrich, San Rafael, Calif.

[73] Assignee: Chevron Research Company, San Francisco, Calif.

[21] Appl. No.: 46,133

[22] Filed: Jun. 6, 1979

[51] Int. Cl.³ .............................................. C08L 91/00
[52] U.S. Cl. ................................... 260/28 R; 528/76; 528/84
[58] Field of Search .................. 260/28 R; 528/76, 84

[56] References Cited

U.S. PATENT DOCUMENTS

| | | | |
|---|---|---|---|
| 3,869,421 | 3/1975 | Sapp et al. | 260/33.6 AQ |
| 3,900,687 | 8/1975 | Meader, Jr. et al. | 428/539 |
| 4,025,683 | 5/1977 | Meader, Jr. et al. | 428/339 |
| 4,036,797 | 7/1977 | Meader, Jr. | 260/28.5 AS |

*Primary Examiner*—Melvyn I. Marquis
*Attorney, Agent, or Firm*—D. A. Newell; S. R. LaPaglia

[57] ABSTRACT

A method is provided for stabilizing a polymerizable premix composition for use in preparing a polyurethane surface and the resulting composition. An aliphatic polyamide is used to achieve the stabilization.

5 Claims, No Drawings

POLYMERIZABLE PREMIX COMPOSITION FOR PREPARATION OF POLYURETHANE SURFACES

BACKGROUND OF THE INVENTION

This invention relates to an asphalt-containing composition suitable for use in preparing an asphalt-extended polyurethane surface. More particularly, it relates to (1) a method for stabilizing a polymerizable mixture comprising a high molecular weight diol component, a low molecular weight chain stiffener component and an asphalt component, (2) the resulting composition, and (3) a process for preparing said surface using the stabilized mixture.

Polymerizable asphalt-extended mixtures, commonly called premixes, are known in the polyurethane art (see for example U.S. Pat. Nos. 3,869,421; 3,900,687; 4,025,683; and 4,036,797). They are used for the preparation of asphalt-extended polyurethane surfaces for bridge decks, industrial membranes, recreational surfaces, such as running tracks, tennis court surfaces and the like, canal or pond linings, liquid surface coverings as in tanks, ponds and the like, road surface elements and the like, to name but a number of representatives. In the preparation, polyisocyanate, usually aryl diisocyanate, is thoroughly admixed into the premix and the resulting polymerizable or polymerizing mixture is applied or used as desired. The resulting product is an asphalt-extended polyurethane surface.

However, a premix frequently suffers from a serious disadvantage. That is, while initially it may be formulated by thorough mixing into a solution or apparently homogeneous substance, for example a dispersion, upon standing two or more separate phases develop. In separated form, the mixture has little or no value as a premix. It is said to have an unsatisfactory shelf life. Thus, there is a need for an improved premix composition which is fully stabilized against phase separations or at least stabilized to such an extent as to exhibit an improved and satisfactory shelf life.

This invention is directed toward (1) a method for stabilizing a premix, (2) the composition resulting from (1) and (3) a process for preparing an asphalt-extended polyurethane surface using the composition of (2).

SUMMARY OF THE INVENTION

A method is provided for stabilizing, or improving the stability of, a polymerizable mixture comprising a high molecular weight diol component, a low molecular weight chain stiffener component and an asphalt component by including therein an effective amount of a stabilizing agent selected from the group consisting of aliphatic polyamide resins having a molecular weight in the range of from about 3000 to 9000 and a softening point below 150° C., said resins being the condensation product of (1) at least one aliphatic polycarboxylic acid having a carboxyl group content in the range 2 to 8 and a carbon atom content in the range 10 to 72 and (2) at least one polyamine of the formula H(HN—R—NH)$_x$H, wherein R is an alkylene radical having a carbon atom content in the range 2 to 5 and X is an integer in the range 1 to 5. Optionally, and preferably, the stabilized mixture may also contain a polyisocyanate polymerization catalyst, an inert filler and one or more of the other materials conventionally included in a polyurethane surface, for example, carbon black, a drying agent, clay aggregates, etc.

A further aspect of the invention is the composition resulting from the above-described method.

A yet further aspect of the invention is a process for producing an asphalt-extended polyurethane surface wherein the above-described stabilized composition is admixed with an effective amount of a polyisocyanate component, preferably mainly aryl diisocyanate, and the resulting polymerizable or polymerizing mixture is applied to a substrate and polymerized.

EMBODIMENT

In a preferred embodiment a premix composition is prepared by admixing the following components in the indicated parts by weight:
Arabian Light Residuum: 41.64
Polyamide resin (Versamid 871): 10.40
N,N-bis(2-hydroxypropyl) Aniline: 5.81
Polybutadienediol (Ave. equivalent wt 1200): 34.26
Polyethylacrylate: 0.05
Dibutyl Tin Dilaurate: 0.01
Toluene: 7.83

The above polyamide resin is a commercial product of General Mills having a softening point of about 93° C.

Comparative storage stabilities of a representative stabilized premix of the above composition and the same mix less the polyamide resin is as follows:

| Storage Stability | Stabilized | Unstabilized |
|---|---|---|
| 2 Months Sludge, Vol. % | 0 | 30 |

Aliphatic polyamide resins are effective stabilizers for unstable premix compositions.

By the term "storage stability" as used herein in connection with a polymerizable mixture containing a dispersed asphalt component is meant the period of time required for at least an appreciable amount of the asphalt of the mixture at ambient conditions to coagulate or to precipitate and coagulate as a separate phase.

By the term "polymerizable" as used herein in connection with a polymerizable mixture (a premix) suitable for use in preparing an asphalt-extended polyurethane surface is meant a composition having a Brookfield viscosity in the range 5,000 to 20,000, preferably 6,500 to 8,500 cp at 25° C. (Brookfield Viscometer Model RVF, Spindle No. 5, 20 rpm) and containing the following components:

I. A high molecular weight diol component characterized by (1) a molecular weight in the range of from about 1,000 to 3,000 units of weight and (2) hydroxyl groups located at or near (within about 4 carbon atoms) the terminal carbon atoms which are separated by an amorphous (relatively free of crystallizable areas), chain of at least about 40 carbon atoms; for example, polybutadiene diol, polyisoprene diol, polybutadiene-styrene diol, polybutadiene-acrylonitrile diol and the like high molecular weight diols;

II. A low molecular weight chain stiffener component selected from the group consisting of polyols, polyamines and hydroxylamines characterized by (1) being mainly difunctional but can contain 5–25, preferably 5–10, equivalent percent of tri- and higher-order-functionality molecules, (2) a separation of the hydroxyl and/or amine groups of the molecules by from 2 to about 12 atoms, (3) a carbon atom content in the range of from about 2 to 18, (4) a molecular weight in the range of from about 62 to 300, (5) atoms between the hydroxyl and/or amine groups which besides carbon may be oxygen, nitrogen or sulfur and (6) less than 3 heteroatoms; for example, such chain stiffeners as 3-dimethyl amino-1,2-propanediol, 1,4-di-(hydroxymethyl) cyclohexane, 1,4-butanediol, 4,4'methylenedianiline, diethanolamine, tolidine, 3-methyl-1,5-pentanediol, trimethylolpropane, glycerine, N,N,N',N'-tetrakis(2-hydroxypropyl) ethylenediamine and N,N-bis(2-hydroxypropyl) aniline; and III. An asphalt component characterized by (1) a softening point (ASTM-D 36–56) in the range of from about 25° to 65° C; (2) a viscosity at 60° C. in the range of from about 100 to 8,000 poise and at 135° C. in the range of from about 50 to 900 cp; and (3) an amount in the range of from 2 to 30 volume percent thereof of a low boiling diluent in an amount sufficient to provide the aforementioned viscosity, preferably a largely aliphatic fraction having a boiling range midpoint in the range of about 110°–140° C.; for example natural asphalts such as a steam reduced asphalt, a petroleum crude still bottoms (a topped crude) and/or a cut-back asphalt containing the above-described hydrocarbon diluent;

wherein the mixture contains an amount by weight of (I) in the range of from about 18 to 50 percent, an amount of III in the range of from about 30 to 80 percent and an amount of II sufficient to provide a mol ratio of isocyanate reactive groups of II to the isocyanate reactive groups of I which is in the range of from about 1 to 8, respectively.

The mixture may also contain, and desirably does contain, a minor amount of a catalyst ordinarily used for curing a polyurethane, for example, dibutyl tin dilaurate; diazabicyclooctane, stannous octoate and the like. The dilaurate is preferred.

The mixture may also contain inert additives or fillers normally employed in the preparation of polyurethane surfaces, coatings and the like, for example, carbon black, driers, fillers such as clay, rubber aggregate and the like.

The term "asphalt" is used herein in its commonly accepted meaning. See for example pages 56 and 57 of "Asphalts and Allied Substances" by Herbert Abraham, Vol. I, 4th Edition, D. Van Nostrand Co. Inc., 1938.

Polyamide Resins

Aliphatic polyamide resins having a molecular weight in the range 3000 to 9000, preferably 3000 to 6500, and a softening point below about 150° C., are, in general, satisfactory and contemplated for use herein. Preferred resins for use in the invention are the condensation product of (1) at least one aliphatic polycarboxylic acid having a carboxyl group content in the range 2 to 8 and a carbon atom content in the range 10 to 72 and (2) at least one polyamine of the formula H(HN—R—NH)$_x$H, wherein R is an alkylene radical having a carbon atom content in the range 2 to 5 and x is an integer in the range 1 to 5.

Aliphatic polyamides suitable for use herein may be prepared by the conventional condensation reaction between a polybasic aliphatic acid and a polyamine. A number of these resins are commercially available, for example, the "Versamids" of General Mills Chemicals, Inc., of Minneapolis, Minnesota or they can be prepared in accordance with several processes described by A. G. Hovey, in Vol. 2, No. 1, fall 1947 issue of "Progress Through Research", published by General Mills, Inc.

The aliphatic polycarboxylic acids used in preparing a suitable polyamide resin are known and are also commercially available as the polymerization product of a polyunsaturated acid, for example linoleic acid. The polymer acid is a mixture of dimer, trimer and tetramer acids and is mainly dimer acid (see for example Encyclopedia of Chemical Technology, Kirk-Othmer, Second Edition, Vol. 8, pps. 847–849).

Polyalkylene polyamines are also known and commercially available. Representative of these and suitable for use herein include ethylene diamine, diethylene triamine, propylene diamine, isopropylene diamine, tetraethylene pentamine, dibutylene triamine, and the like.

The amount of the polyamide resin required to improve storage stability of a premix varies depending upon the particular asphalt component and polyamide employed. In general, a satisfactory premix having enhanced storability is obtained, when the amount of polyamide, based by weight upon the asphalt, is in the range of from about 5 to 30, preferably 10 to 20 percent. Enough polyamide should be used to provide at least a substantial (20 percent) increase in the storage stability (shelf life) of the premix.

Diluent/Solvent

The premix contains an inert volatile solvent or diluent as required to provide the premix with a viscosity in the range 5,000 to 20,000, preferably 6,500 to 8,500 cp. A viscosity in this range is necessary to facilitate the handling and spreading characteristics of the premix composition. Suitable diluents include toluene, xylenes, low boiling ketones, such as methyl ethyl ketone, hexane, heptane, cyclohexane and the like. Preferably, and for reasons of cost, a preferred diluent is a largely aliphatic low-boiling petroleum refinery fraction or cut having a midpoint of its boiling range in the range of from about 110°–140° C.

Polymerization

The preparation of an asphalt-extended polyurethane surface, of itself, is known and not considered to be inventive (see, for example, the above-cited United States patents). Briefly, a premix plus one or more inert fillers, if desired, is admixed with a polyisocyanate in an amount sufficient to provide in the resulting mixture a ratio of isocyanate group to isocyanate reactive groups (hereinafter referred to as the NCO/OH ratio) in the range of about 0.8–1.4 to 1, preferably 1.05–1.15 to 1, respectively. Where polyisocyanate may be lost due to diffusion from the mixture or for other ordinary reasons, use of a slightly higher NCO/OH ratio may be desirable.

The polyisocyanates will generally be diisocyanates or mixtures of diisocyanates with higher orders of polyisocyanates, normally not exceeding 5 isocyanate groups. Usually, in mixtures of di- and higher order polyisocyanates, the higher order polyisocyantes will be present in not more than 50 equivalent percent, usually not more than 20 equivalent percent. Preferably, diisocyanates are used. The higher order polyisocyanates (greater than di-) have at least 12 carbon atoms and usually do not exceed 46 carbon atoms. The diisocyanates generally vary from about 6 to 24 carbon atoms.

Illustrative polyisocyanates include diphenyl diisocyanate, bis(isocyanatophenyl) methane, 1,5-napthalene diisocyanate, polyphenyl polymethylene isocyanate (PAPI, supplied by Upjohn Co.), tolylene diisocyanate (TDI), hexamethylene diisocyanate, dodecamethylene diisocyanate, 1,4-diisocyanatocyclohexane, poly (methylene phenylene polyisocyanate). Bis(isocyanatophenyl) methane, for example Isonate (trademark) 143L supplied by Upjohn Polymer Chemicals Co., is preferred.

The following examples are for further illustration, but not limitation, of the invention. All parts, unless otherwise specified, are by weight.

EXAMPLES

In the following examples 1-3 a premix was prepared using an Arabian Light residuum asphalt having a viscosity at 60° C. of about 120 poise. The high molecular weight diol component (HMDIOL) was a polybutadiene diol of average molecular weight 2500-2800. The stiffener was N,N-bis(2-hydroxypropyl)aniline and the catalyst was dibutyl tin dilaurate. For purposes of comparison two premix formulations were employed:

| Formulation Type Components, Parts: | I | II |
| --- | --- | --- |
| Asphalt | 47.25 | 37.79 |
| Resin | None | 9.46 |
| HMDIOL | 38.69 | 38.69 |
| Stiffener | 6.56 | 6.56 |
| Polyethyl Acrylate | .05 | .05 |
| Catalyst | .01 | .01 |
| Toluene | 7.44 | 7.44 |

In the table premix compositions containing a variety of resin modifiers are listed, the storage stability results obtained for them, and polymerization results using the premix and 12-14 g of (Isonate 143L) polyisocyanate per 100 g of diluted premix.

| Example No. | 1 | 2 | 3 |
| --- | --- | --- | --- |
| Resin | None | 871-Amid[1] | 940-Amid[2] |
| Formulation Type | I | II | II |
| Initial Brookfield Vis., 25° C., cp | 5,300 | 9,180 | 6,760 |
| Premix Storage Stability | | | |
| 1 Week Appearance | Heavy Gel | Stiff Gel | Smooth |
| 10 Weeks Appearance | Heavy Sludge | Stiff Gel | Smooth |
| POLYMERIZED PREMIX | | | |
| Physical Properties of Cured Membrane | | | |
| Tensile Strength, psi | 568 | 476 | 519 |
| Initial Modulus, psi | 550 | 590 | 1,000 |
| Elongation to Break, % | 373 | 403 | 417 |
| Tear Strength, ppi | | | |
| 2-ipm | 25 | 31 | 36 |
| 20-ipm | 32 | 35 | 38 |
| Shore A Hardness | 63 | 63 | 67 |

FOOTNOTE:
[1] General Mills' Versamid 871 used; softening point 93° C.
[2] General Mills' Versamid 940 used; softening poit 110° C.

From a comparison of the data in the table, it is evident that a polyamide resin modified premix has excellent storage stability, especially relative to unstabilized premix (Examples 2 and 3 vs. 1). It is also evident that a polyurethane surface prepared by using a polyamide resin stabilized premix exhibits, in many respects, superior physical properties relative to an unstabilized premix (Examples 2 and 3 vs. 1).

What is claimed is:

1. A method for improving the storage stability of a polymerizable mixture comprising a high molecular weight diol component, a low molecular weight chain stiffener component and an asphalt component which comprises at least substantially increasing said stability by admixing into said mixture an effective amount to improve storage stability of at least one aliphatic polyamide resin having a molecular weight in the range of from about 3000 to 9000 and a softening point below 150° C., said resin being the condensation product of (1) at least one aliphatic polycarboxylic acid having a carboxyl group content in the range 2 to 8 and a carbon atom content in the range 10 to 72 and (2) at least one polyamine of the formula $(H(HN-R-NH)_xH$, wherein R is an alkylene radical having a carbon atom content in the range 2 to 5 and x is an integer in the range 1 to 5.

2. A method as in claim 1 wherein said amount of resin, based by weight upon said asphalt component, is in the range of from about 5 to 30 percent.

3. In a polymerizable mixture comprising a high molecular weight diol component, a low molecular weight chain stiffener component and an asphalt component, wherein said asphalt is present in the form of an unstabilized dispersion, solute or sol, the improvement comprising said mixture containing an effective amount to improve storage stability of at least one aliphatic polyamide resin having a molecular weight in the range of from about 3000 to 9000 and a softening point below 150° C., said resin being the condensation product of (1) at least one aliphatic polycarboxylic acid having a carboxyl group content in the range 2 to 8 and a carbon atom content in the range 10 to 72 and (2) at least one polyamine of the formula $(H(HN-R-NH)_xH$, wherein R is an alkylene radical having a carbon atom content in the range 2 to 5 and x is an integer in the range 1 to 5.

4. A mixture as in claim 3 wherein said polyamide, based by weight upon said asphalt component, is present in an amount in the range of from about 5 to 30 percent.

5. In a process for producing an asphalt-extended polyurethane surface by admixing an effective amount of a polyisocyanate component with a polymerizable mixture comprising a high molecular weight diol component, a low molecular weight chain stiffener component and an asphalt component, the improvement comprising using as said mixture the composition of claim 4.

* * * * *